Jan. 5, 1937.                G. C. J. GRAY                2,066,621
                              FEED GRINDER
                           Filed Jan. 6, 1934

Inventor
G.C.J. Gray

By Emil F. Lange
Attorney

Patented Jan. 5, 1937

2,066,621

UNITED STATES PATENT OFFICE 2,066,621

FEED GRINDER

Garold C. J. Gray, Hastings, Nebr., assignor to Western Land Roller Company, Hastings, Nebr., a partnership composed of M. C. Anderson, Paul Anderson, Carrie Glass, M. George Anderson, Edna Anderson, Arthur H. Anderson, and Charles M. Anderson Application January 6, 1934, Serial No. 705,628

2 Claims. (Cl. 83—111)

My invention relates to feed grinders, its primary object being the provision of an improved feed grinder for reducing feeds of all types from small grains to corn stalk fodder and damp hay.

Another object of my invention is the provision of removable and replaceable sections of the concave combined with means for securing the screen in position.

Another object of the invention is the provision of a concave which is slightly eccentric to the axis of rotation of the hammers so that the hammers will move closer and closer to the ribs of the concave when grinding the feed between the hammers and the ribs of the concave.

Another object of the invention is the provision of a concave having ribs so arranged as to overcome the tendency of the feed to move toward the side walls of the feed grinder.

Another object of the invention is the provision of means at the side walls of the feed grinder for causing the feed to deflect back into the grinding area to thereby reduce excessive wear on the end hammers.

Another object of the invention is the provision of a pair of novel feed rollers for feeding the material toward the cutters and toward the hammers.

Having in view these objects and others which will be pointed out in the following description, I will now refer to the drawing, in which Figure 1 is a view in side elevation of my feed grinder with a side wall removed to disclose the operating mechanism.

Figure 1:
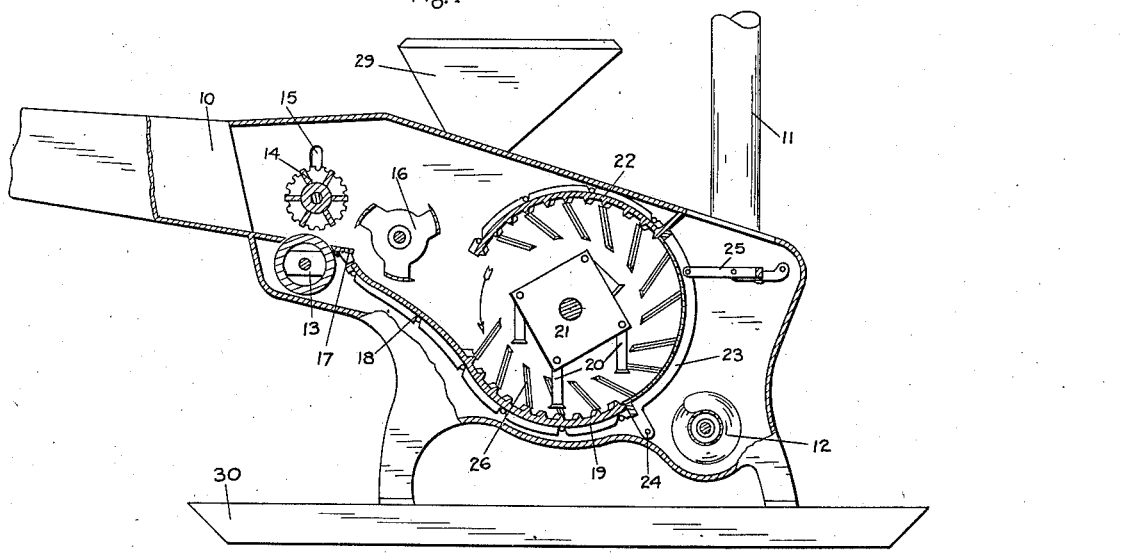

The feed enters the machine through the chute 10 and it leaves the machine through a vertical stack 11 to which it is fed through a screw conveyor 12. As the feed enters the chute 10 it first encounters the feed rolls 13 and 14. The feed roll 13 is fixed in position but the feed roll 14 has a floating relation due to the fact that the ends of its shaft are seated in slots 15 in the sides of the machine. The feed then encounters the cutting reel 16 the knives of which coact with the shearing blade 17 to reduce the feed into pieces of a size in which it may be readily acted upon by the hammers and concaves. The cutting reel 16 is useful in the case of corn fodder and similar fibrous feed but it has little or no function in connection with small grains.

Figure 2:
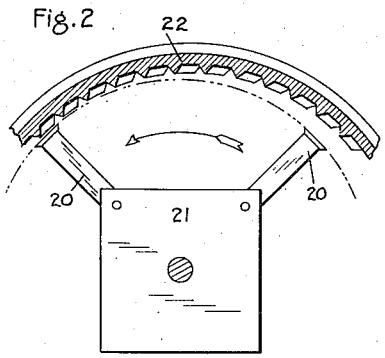
Figure 2 is a fragmentary view of portions of the hammer reel and one of the concaves, the view showing particularly but in exaggerated form the relation between the inner face of the concave and the path of the hammers.

The feed then passes down to the extension 18 of the concave 19 where it is acted upon by the hammers 20 of the hammer reel 21. As shown in exaggerated form in Figure 2, the hammers are first spaced from the ribs of the concave but as these hammers move forwardly they approach closer and closer to the ribs of the concave to progressively reduce the feed to a size such that the minimum of feed will be carried around to be reground. Any feed not ground on the concave 19 to a sufficiently reduced size will be carried around to the concave 22 where the same process is repeated. The feed may be carried around through several revolutions but these revolutions are decreased in number due to the fact that both concave sections have similar eccentric relations to the axis of rotation of the hammer reel. At the rear of the machine between the rear ends of the concave sections 19 and 22 is a screen which is held in position by means of a screen holder 23. Screens having larger or smaller openings may be used interchangeably in the machine and they determine the size of the particles of ground feed which reach the screw conveyor 12.

The screen holder 23 consists of a frame which is pivoted at 24 and is of such shape and size that it will contact with the side walls of the casing and with the ends of the concave sections 19 and 22. A toggle or dead center latch 25 is provided for quickly releasing or securing the screen frame in position so that the screens may be readily and quickly changed from one size to another as desired.

Figure 4:
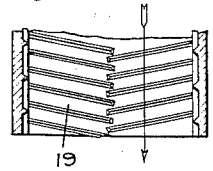
Figure 4 is a fragmentary view in flattened out projection showing the ribs of one of the concaves and showing particularly the positions of these ribs in relation to the direction of movement of the hammers.

The hammers 20 create a powerful blast of air with considerable pressure due to the rapid rotation of the hammer reel 21. This blast is generally in the direction of rotation of the hammer reel 21 but the pressures tend to become greatest adjacent the side walls of a grinding cylinder due to the fact that the air tends to move outwardly in radial directions along the sides of the grinding cylinder. This places an extra burden on the end hammers of the hammer reel and causes their wearing out at a much more rapid rate than that at which the intermediate hammers are worn down. In order to more equally distribute the air pressures within the grinding cylinder, I have arranged the grinding ribs of the concave as shown in Figure 4. Instead of making these ribs parallel to the axis of rotation or inclined in one direction to the axis of rotation, I arrange them in two pairs which tend to direct the air currents toward the middle of the grinding cylinder. Were it not for the unequal air pressures within the grinding cylinder, the arrangement shown in Figure 4 would be objectionable due to the fact that it would force the partly ground feed to accumulate in the middle portion of the concaves and it would result in excessive wear on the middle hammers of the reel. The arrangement is designed to counteract the inequalities of pressure and the ribs are therefore so pitched as to distribute the partly ground feed evenly over the concaves.

Figure 3:
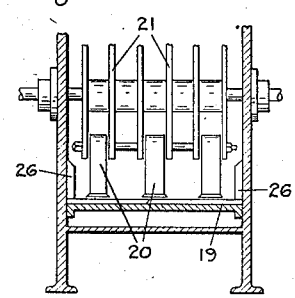
Figure 3 is a view in vertical section showing a portion of the hammer reel and hammers in their relation to the side walls of the casing of the feed grinder.

The difficulty due to uneven pressures within the grinding cylinder also causes the packing of the partly ground feed against the side walls of the grinding cylinder. I therefore provide ribs 26 positioned against the side walls of the grinding cylinder as shown in Figure 3 and inclined toward the direction of rotation of the hammer reel as shown in Figure 1. The ribs 26 set up eddy currents in the compressed air which dislodge the feed which would otherwise become impacted against the side walls of the grinding cylinder. These air currents tend to move in a direction opposite the direction of rotation of the grinding cylinder and they carry the partly ground feed away from the side walls of the grinding cylinder and hurl it into the grinding area of the hammer reels against the ribs of the concaves where it is evenly distributed throughout that area.

Figure 5:
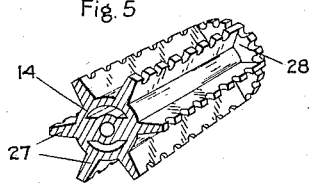
Figure 5 is a perspective view showing a section of the feed roll.

The feed roll 14 is shown in Figure 5, its floating position being shown in Figure 1. This feed roll is fairly heavy and it is provided with a plurality of radial blades 27 which are corrugated or notched throughout their lengths. At both ends are disks 28 the peripheries of which are also corrugated. It is quite obvious that such a feed roll will be much more effective than one which has smooth edges and peripheries.

The machine may function not only as a feed grinder but also as an ensilage cutter. If the feed is to be cut coarse either for feeding directly or for storage in a silo, the screen may be removed and the material may be fed through the chute 10. It then passes through the cutters and is driven by the hammer reel through the screen opening where it is picked up by the conveyor 12 to be elevated to the desired height through the elevator 11.

The machine is also equipped with a supplemental hopper 29 for delivery of material between the cutting mechanism and the grinding mechanism. This is designed for use with grains which need not pass through the feed rolls and the cutting mechanism but which are merely to be ground. The supplemental hopper is also useful when it is desired to mix one ground feed with another which is to be ground. The machine as a whole is supported on skids 30 so that it may be readily moved from place to place.

Having thus described my invention in such full, clear, and exact terms that its construction and operation will be readily understood by others skilled in the art to which it pertains, what I claim as new and desire to secure by Letters Patent of the United States is:

1. In a feed grinder, the combination of a concave and a hammer reel, and ribs on said concave, said ribs being inclined from the opposite lateral edges of said concave in the direction of rotation of said hammer reel, opposed ribs overlapping each other at their inner ends.

2. In a feed grinder, the combination of a concave and a hammer reel, and two series of ribs on said concave, the ribs of each series extending from the lateral edge of said concave to points beyond the median arc thereof, all of said ribs being inclined from their outer to their inner extremities in the direction of rotation of said hammer reel.

GAROLD C. J. GRAY.